United States Patent
Brondijk et al.

(10) Patent No.: US 8,040,773 B2
(45) Date of Patent: Oct. 18, 2011

(54) METHOD AND RECORDER FOR REDUCING REJECTION OF RECORD CARRIERS DUE TO WRITE ERRORS

(75) Inventors: Robert Albertus Brondijk, Eindhoven (NL); Stephanus Josephus Maria Van Beckhoven, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 12/643,309

(22) Filed: Dec. 21, 2009

(65) Prior Publication Data
US 2010/0128587 A1   May 27, 2010

Related U.S. Application Data

(63) Continuation of application No. 10/561,994, filed on Dec. 23, 2005, now abandoned.

(30) Foreign Application Priority Data

Jun. 26, 2003   (EP) .................................... 03076991

(51) Int. Cl.
*G11B 7/00* (2006.01)
(52) U.S. Cl. .................................... 369/53.1; 369/53.35
(58) Field of Classification Search ................. 369/53.1, 369/53.12, 53.13, 53.14, 53.15, 53.24, 53.17, 369/53.32, 53.35, 53.36, 53.42, 59.25
See application file for complete search history.

(56) References Cited

U.S. PATENT DOCUMENTS

| 7,072,256 | B2 | 7/2006 | Ueda et al. |
| 7,102,988 | B2 | 9/2006 | Hirotsune et al. |

FOREIGN PATENT DOCUMENTS

| JP | 2254677 | * 10/1990 | ................. 369/53.13 |
| JP | 05109191 | 4/1993 | |

* cited by examiner

*Primary Examiner* — Nabil Z Hindi

(57) ABSTRACT

When writing on a recordable medium the recorder can encounter write errors. When a write error occurrs the record carrier is discarded. By ignoring write errors in sections of the record carrier comprising unused information, for instance sections of the lead-in or lead-out the record carrier no longer needs to be discarded.

12 Claims, 3 Drawing Sheets

METHOD AND RECORDER FOR REDUCING REJECTION OF RECORD CARRIERS DUE TO WRITE ERRORS

The invention relates to a method for recording information on a record carrier in response to a format command or a close track session command comprising the steps of receiving a format command or a close track session command writing data blocks in response to the format command or close track session command.

Such a method is known from the MMC310 standard NCITS XXX T10/1363-D.

As an example selected from the MMC310 standard the CLOSE TRACK/SESSION command allows closure of either a track or a session.

For CD Closing a Session shall cause the Lead-in and Lead-out to be written for the incomplete Session. Closing a Session when the last session is closed shall not be considered an error. Closing a session when the last session is empty shall cause no actions to be performed and shall not be considered an error. For instance for DVD-R/-RW and DVD+R/+RW, closing an incomplete or intermediate Session shall cause the Lead-in or Border-in, Border-out, and closure intro to be written for the incomplete or intermediate Session.

Closing a Track or Session shall cause a Class 1 Event when the command is issued if the Logical Unit becomes NOT READY. A Class 1 Event shall occur if the medium returns to READY or if the medium becomes un-writable. Other Class 1 Events may occur due to closing a Track or Session.

The medium is declared unwriteable when a write error occurs during the execution of the close track session command.

It is a disadvantage of the method known from the MMC310 standard that a write error can lead to an unwriteable record carrier that can no longer be used for recording.

It is an objective of the present invention to reduce the number of record carriers that can no longer be used for recording when a write error occurs.

To achieve this objective the method of the invention is characterized in that if a write error occurs in a data block comprising unused information the write error is ignored When during a write operation an error is encountered the recording device must determine whether the error occurred in a data block comprising data required to be used or retrieved or whether the write error occurred in an area that comprises unused dat. If the data will not be used and is not required for proper operation of the recorder the error can safely be ignore. There is no longer a need to discard a record carrier comprising an error in a data block comprising unused information, effectively reducing the number of discarded recording media.

A further embodiment of the method is characterized in that when an error is ignored no error is reported.

In order to ensure compatibility with higher level applications the write error is not reported and the higher level application thinks the record carrier is successfully recorded. This prevents the higher level from discarding the record carrier, effectively reducing the number of discarded recording media.

A further embodiment of the method is characterized in that the data block comprising unused information is comprised in a lead-in or a lead-out. The lead-in and lead-out both comprises information that is not used for retrieving information from the record carrier. When an error occurrs in writing this information the write error can safely be ignored, effectively reducing the number of discarded recording media.

A further embodiment of the method is characterized in that the unused information is a reserved block.

Information in a reserved block is not currently used as is thus not of importance for the proper retrieval of data and information from the record carrier since no access to the reserved block is required. A write error in a reserved block can be safely ignored, effectively reducing the number of discarded recording media.

A further embodiment of the method is characterized in that the unused information is comprised in a data area and that the unused information comprises a data block filled with all zeros.

An example of this is padding of data in order to fill a data block if the user data in the data area does not completely and exactly fill the data block. When a write error occurrs in the section of the data block padded with zeros the write error can be safely ignored, effectively reducing the number of discarded recording media.

A further embodiment of the method is characterized in that the record carrier is a write once record carrier and the unused information is not comprised in an inner-disc count zone, or in a recorded area indicator, or in a control data block, or in a table of contents, or in a SDBC, or in a session control data or an outer disc administration zone.

On a write once record carrier the information comprised in an inner-disc count zone, or in a recorded area indicator, or in a control data block, or in a table of contents, or in a SDBC, or in a session control data or an outer disc administration zone is essential and write errors cannot be ignored for the record carrier to remain useable. However write errors outside of the inner-disc count zone, or the recorded area indicator, or the control data block, or the table of contents, or the SDBC, or the session control data or the outer disc administration zone can be ignored with a reduced risk of problem retrieving information and data from the record carrier A further embodiment of the method is characterized in that the record carrier is a rewriteable record carrier and the unused information is not comprised in an inner disc identification zone or in a control data zone or in an outer disc identification zone.

On a rewriteable record carrier the information comprised in the inner disc identification zone or in the control data zone or in the outer disc identification zone is essential and write errors cannot be ignored for the record carrier to remain useable. However write errors outside of the inner disc identification zone or the control data zone or the outer disc identification zone. can be ignored with a reduced risk of problem retrieving information and data from the record carrier A recorder for recording information on a record carrier in response to a format command or a close track session command comprising a processor coupled to an interface for receiving a format command or a close track session command through the interface and coupled to writing means for writing data blocks in response to the format command or close track session command is characterized in that the processor is operative to ignore an error when an error occurs while writing data comprising unused information.

When the recorder ignores write errors while writing data comprising unused information less recording media will be discarded because of write errors.

An embodiment of the recorder is characterized in that when an error is ignored the processor is operative to suppress an error report.

In order to ensure compatibility with higher level applications the write error is not reported and the higher level application thinks the record carrier is successfully recorded. This prevents the higher level from discarding the record carrier, effectively reducing the number of discarded recording media.

A further embodiment of the recorder is characterized in that the data block comprising unused information is comprised in a lead-in or a lead-out.

The lead-in and lead-out both comprise information that is not used for retrieving information from the record carrier. When the recorder encounters an error while writing this information the write error can safely be ignored, effectively reducing the number of discarded recording media.

A further embodiment of the recorder is characterized in that the unused information is a reserved block.

Information in a reserved block is not currently used by the recorder as is thus not of importance for the proper retrieval of data and information from the record carrier since no access to the reserved block is required. When the recorder encounters a write error in a reserved block it can safely be ignored, effectively reducing the number of discarded recording media.

A further embodiment of the recorder is characterized in that the unused information is comprised in a data area and that the unused information comprises a data block filled with all zeros.

An example of this is when the recorder pads the data in a data block in order to fill a data block if the user data in the data area does not completely and exactly fill the data block. When the recorder encounters a write error occurrs in the section of the data block padded with zeros the write error can be safely ignored, effectively reducing the number of discarded recording media.

A further embodiment of the recorder is characterized in that the record carrier is a write once record carrier and the unused information is not comprised in an inner-disc count zone, or in a recorded area indicator, or in a control data block, or in a table of contents, or in a SDBC, or in a session control data or an outer disc administration zone On a write once record carrier the information comprised in an inner-disc count zone, or in a recorded area indicator, or in a control data block, or in a table of contents, or in a SDBC, or in a session control data or an outer disc administration zone is essential for the recorder or playback device and write errors cannot be ignored by the recorder for the record carrier to remain useable. However write errors outside of the inner-disc count zone, or the recorded area indicator, or the control data block, or the table of contents, or the SDBC, or the session control data or the outer disc administration zone can be ignored by the recorder with a reduced risk of problem retrieving information and data from the record carrier A further embodiment of the recorder is characterized in that the record carrier is a rewriteable record carrier and the unused information is not comprised in an inner disc identification zone or in a control data zone or in an outer disc identification zone.

The invention will now be described based on figures.

Figure 1:
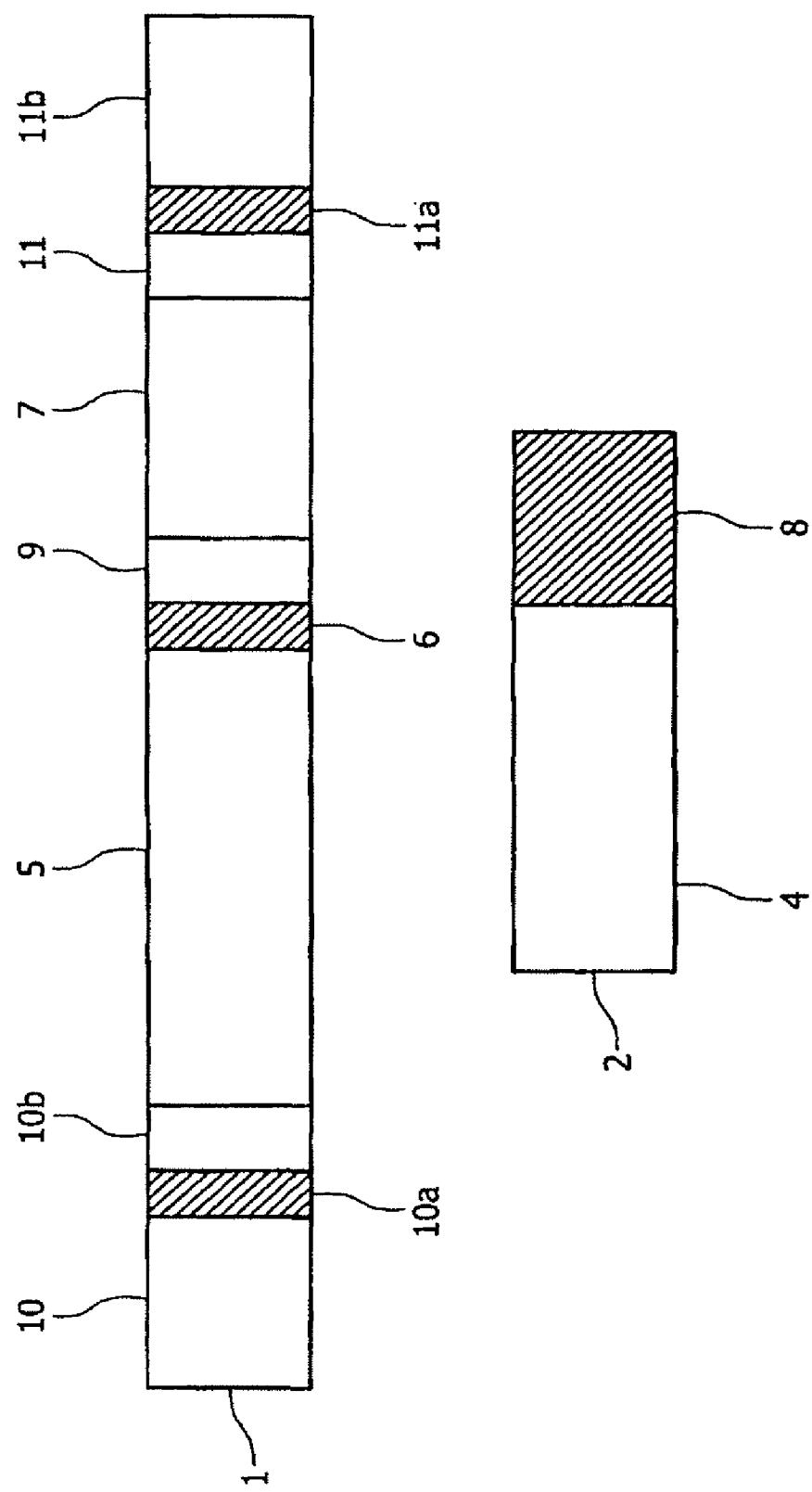
FIG. 1 shows the data structure of a record carrier
Figure 2:
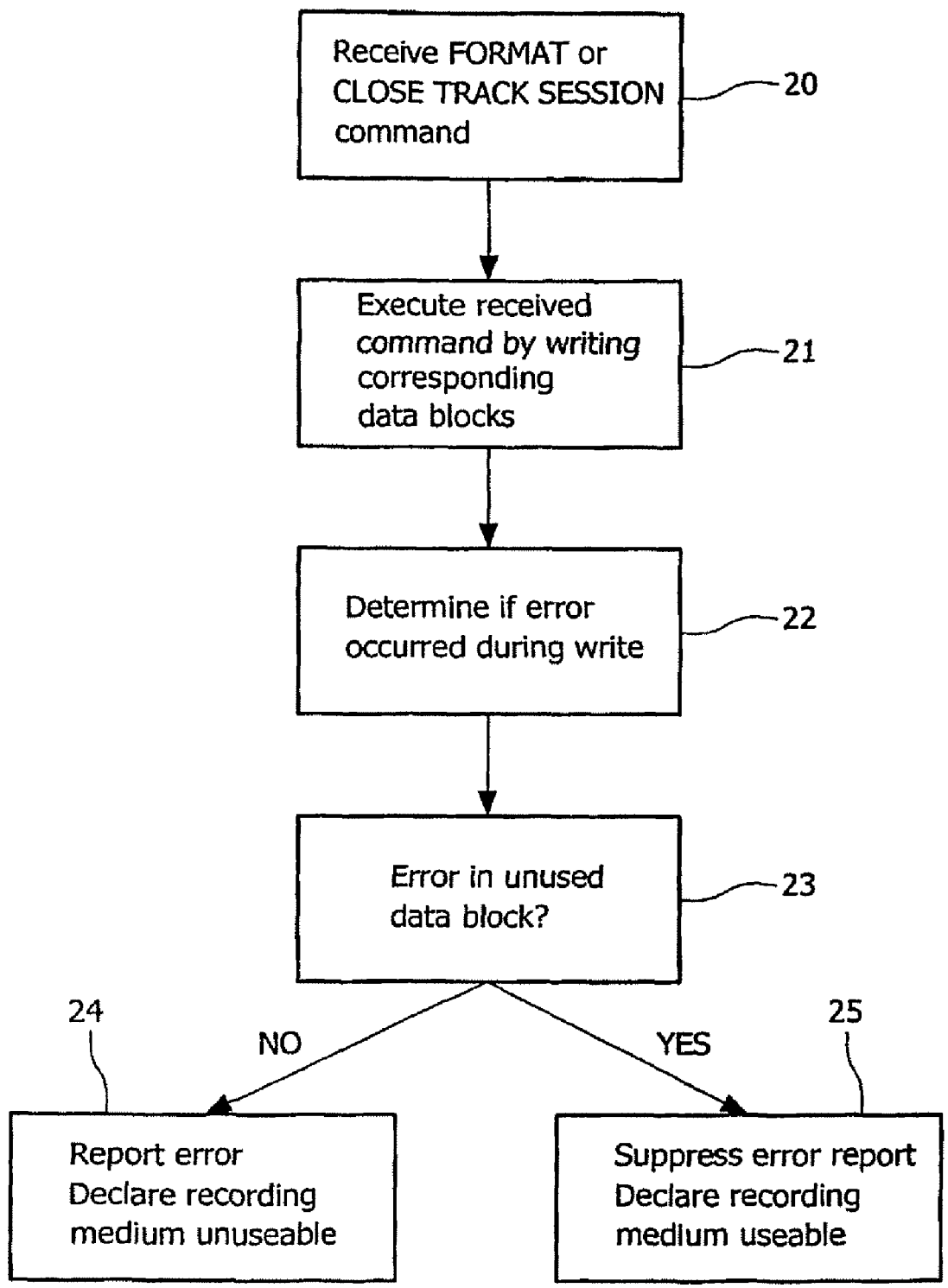
FIG. 2 shows a recorder

The record carrier comprises a track 1 with a lead-in area 10, 10a, 10b, a user data area 5, 6, 7, 9, a lead-out area 11, 11a, 11b, and a recorded area indicator 2. The recorded area indicator 2 comprises an area 4 indicating recorded data blocks on the record carrier and an area 8 indicating data blocks that are still available for recording. In the recorded area indicator recorded data blocks a recorded data block are indicated by a '1' while an available data block is indicated by a '0'.

The lead-in area 10, 10a, 10b comprises mandatory information in a first section 10 of the lead-in area and a second section 10b of the lead-in area and comprises non-mandatory information in a reserved block 10a of the lead-in area.

When a write error is encountered by the recorder in the first or second section mandatory information, i.e. essential data for retrieving data from the record carrier 1 is corrupted, the write error may not be ignored and must be reported. If the write error is encountered in the reserved block the information is not mandatory and is only used in the future or under special condictions. The write error can be safely ignored if the reserved block is reserved for future use. The write error can be safely ignored when the special conditions do not apply for the record carrier. For instance if the record carrier is used to record a video stream and the reserved block 10b comprises information only relevant for a audio-only use of the record carrier the retrieval of the video stream will not be affected if the reserved block comprises corrupt information due to a write error. There is in this circumstance no need to discard the record carrier due to the write error.

Also the lead-out area 11, 11a, 11b comprises a first section 11 and a second section 11b with mandatory information, while a reserved block 11a comprises information that is not mandatory. Consequently the same considerations as for the lead-in area outlined above apply.

Figure 3:
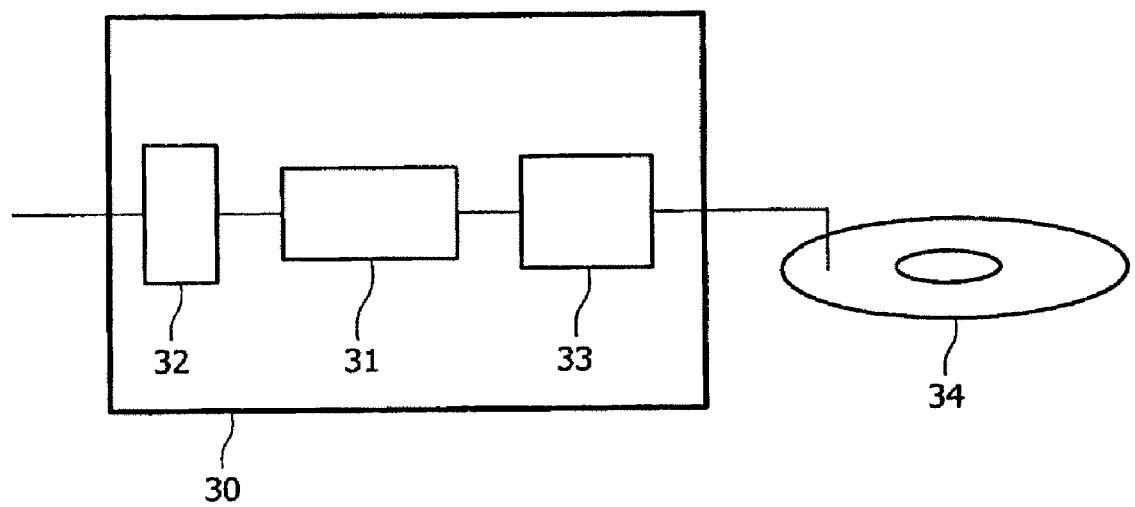
FIG. 3 show the flow chart of the error handling during the writing process.

FIG. 3 show the flow chart of the error handling during the writing process. In the first step 20 the recorder receives and parses a format or close track session command received.

In the second step 21 the recorder starts writing data to the record carrier in response to the received command. For instance when a format command is received the recorder start writing data blocks on the record carrier in order to apply a format to the record carrier in preparation of the recording of user data.

Another example is the writing of the lead-in and lead-out in response to the close track session command.

During the recording in the second step 21 errors can occurr. The recorder must then, either during the recording or after the recording is completed, determine whether a write error occurred. This is in this embodiment as shown in FIG. 3 handled in the third step 22 after the recording is completed.

When an write error was encountered in the third step 22, in the fourth step 23 the recorder must determine whether the write error occurred in an essential data block or in a data block that is unused, for instance because it is a reserved data block.

If the write error did not occurr in an unused data block the recorder will in a fifth step 24 issue an error message via the interface and, depending on where the error occurred, declare the record carrier unuseable. Areas where the recorder will report an write error are the inner-disc count zone, the recorded area indicator, the control data block, the table of contents, the SDBC, the session control data or the outer disc administration zone for a write once medium.

Areas where the recorder will report an write error are the inner disc identification zone, the control data zone or the outer disc identification zone.

In an alternative outcome of the fourth step 23 the recorder suppresses in the fifth step 25grtf edxcszgr the issuing of the error message. The record carrier is not declared unuseable and can be used again for future recordings.

FIG. 3 shows a recorder.

The recorder 30 for recording information on a record carrier 34 in response to a format command or a close track session command comprises a processor 31 coupled to an interface 32 for receiving a format command or a close track session command through the interface 32 and is coupled to writing means 33 in the form of a basic bit engine for writing data blocks in response to the format command or close track session command.

The processor 31 ignores an error when an error occurs while writing data blocks through the writing means 33 and suppresses the error message so that when a write error is detected no error message is provided to a higher level application or another device coupled to the recorder via the interface 32.

The invention claimed is:

1. Method for recording information on a record carrier in response to a format command or a close track session command comprising the steps of
  receiving a format command or a close track session command
  writing data blocks in response to the format command or close track session command
wherein if a write error occurs in response to the format command or close track session command in a data block comprising unused information in at least one of: a lead-in area and a lead-out area the write error is ignored.

2. Method as claimed in claim 1,
wherein when the write error is ignored no error is reported.

3. Method as claimed in claim 1,
wherein the unused information is in a reserved block.

4. Method as claimed in claim 1,
wherein in that the unused information is comprised in a data area and that the unused information comprises a data block filled with all zeros.

5. Method as claimed in claim 1,
wherein the record carrier is a write once record carrier and the unused information is not comprised in at least one of: an inner-disc count zone, a recorded area indicator, a control data block, a table of contents, a SDBC, a session control data and an outer disc administration zone.

6. Method as claimed in claim 1,
wherein the record carrier is a rewriteable record carrier and the unused information is not comprised in at least one of: an inner disc identification zone, a control data zone, and an outer disc identification zone.

7. Recorder for recording information on a record carrier in response to a format command or a close track session command comprising:
  a processor coupled to an interface for receiving a format command or a close track session command through the interface and coupled to writing means for writing data blocks in response to the format command or close track session command
wherein the processor is operative to ignore an error when an error occurs while writing data blocks in response to the format command or close track session command in a data block comprising unused information in at least one of: a lead-in area and a lead-out area.

8. Recorder as claimed in claim 7,
wherein when an error is ignored the processor is operative to suppress an error report.

9. Recorder as claimed in claim 7,
wherein the unused information is in a reserved block.

10. Recorder as claimed in claim 7,
wherein the unused information is comprised in a data area and that the unused information comprises a data block filled with all zeros.

11. Recorder as claimed in claim 7,
wherein the record carrier is a write once record carrier and the unused information is not comprised in at least one of: an inner-disc count zone, a recorded area indicator, a control data block, a table of contents, a SDBC, a session control data and an outer disc administration zone.

12. Recorder as claimed in claim 7,
wherein the record carrier is a rewriteable record carrier and the unused information is not comprised in at least one of: an inner disc identification zone, a control data zone, and an outer disc identification zone.

* * * * *